United States Patent [19]

Schumacher

[11] Patent Number: 5,797,587
[45] Date of Patent: Aug. 25, 1998

[54] HYDRAULIC UNIT WITH ELECTROMAGNETIC REGULATOR AND CLOSING PART

[75] Inventor: Steffen Schumacher, Renningen, Germany

[73] Assignee: Robert Bosch GmbH, Stuttgart, Germany

[21] Appl. No.: 656,810

[22] Filed: Jun. 3, 1996

[30] Foreign Application Priority Data

Jun. 13, 1995 [DE] Germany ............... 195 21 510.9

[51] Int. Cl.$^6$ ................................................. F16K 31/06
[52] U.S. Cl. ............................. 251/129.21; 137/625.65
[58] Field of Search .................... 251/129.15, 129.21, 251/129.16; 137/625.65; 335/255, 279

[56] References Cited

U.S. PATENT DOCUMENTS

| | | | |
|---|---|---|---|
| 4,643,359 | 2/1987 | Casey | 251/129.15 X |
| 5,302,930 | 4/1994 | Brehm et al. | 251/129.15 X |
| 5,651,530 | 7/1997 | Krimmer et al. | 251/129.21 |

FOREIGN PATENT DOCUMENTS

| | | |
|---|---|---|
| 4009535A1 | 10/1990 | Germany . |
| 41 35 993 | 12/1992 | Germany . |
| 9300848 | 1/1993 | Germany . |
| 4202389A1 | 8/1993 | Germany . |

*Primary Examiner*—Kevin Lee
*Attorney, Agent, or Firm*—Michael J. Striker

[57] ABSTRACT

A hydraulic unit has a closing plate having at least one recess in which a supply passage and a discharge passage for pressure medium open, an electromagnetic regulator inserted in said recess and having a magnetic part composed of a housing, a magnetic coil with a coil core, a flux conducting element and an armature. The closing plate has a supply projection extending in the recess of the closing plate and receiving the supply passage. The supply projection has an end extending in the magnetic part of the regulator and ending in a sealing seat. The sealing seat cooperates with the armature of the magnetic part for controling the discharge passage.

11 Claims, 2 Drawing Sheets

HYDRAULIC UNIT WITH ELECTROMAGNETIC REGULATOR AND CLOSING PART

BACKGROUND OF THE INVENTION

The present invention relates generally to hydraulic units.

Hydraulic units are known in the art, and some of them are utilized in automatic transmissions of motor vehicles. They are usually mounted on a control plate of the transmission and control or regulate the pressure medium flow.

One of such hydraulic units is disclosed, for example in the German Patent Document DE-GM 93 00 848. In this hydraulic unit a regulator with its valve closing element is inserted in a recess formed in a supporting plate. The connection of the supporting plate and the regulator is performed in a force-transmitting manner through a metal clamp screwed with the supported plate. The supporting plate is composed of steel or die-cast material and, before being equipped with the regulator, is machined in a material removing operation. Passages for hydraulic supply and discharge are formed in the valve closing element of the regulator and sealed from one another and from outside by two sealing rings.

A plurality of small components, such as screws, holding clamps, and sealing rings which are needed for the connection of the regulator with the supporting plate cause not only a great space consumption on the supporting plate but also a relatively high mounting expense. These factors as well as the extensive material removal of the supporting plate involve high manufacturing costs. Furthermore, pretensioning losses, for example due to aging, are caused by different heat expansion coefficients of the materials connected with one another or damage of sealing rings and lead to undesired untightness.

SUMMARY OF THE INVENTION

Accordingly, it is an object of the present invention to provide a hydraulic unit of the above mentioned general type which avoids the disadvantages of the prior art.

In keeping with these objects and with others which will become apparent hereinafter, one feature of the present invention resides, briefly stated, in a hydraulic unit with a closing plate having at least one recess with a supply passage and a discharge passage for a pressure medium and an electromagnetic regulator with a magnetic valve inserted in the recess, wherein in accordance with the inventive features, a supply projection which receives the supply passage and is formed at the side of the closing plate is inserted in the recess of the closing plate, the supply projection is inserted with its end in the magnetic part of the regulator and ends there in a supply-side sealing seat, and the sealing seat cooperates with an armature of the magnetic part for controlling the discharge passage at the discharge side of the plate.

When the hydraulic unit is designed in accordance with the present invention, it has the advantage that in view of the a material-uninterrupted connection of two synthetic plastic parts by a welding or glueing process without additional sealing components, no pressure medium leakage outwardly can occur anymore. For producing of the pressure-tight connection, especially the ultrasound or laser welding processes are suitable, since they provide a point-accurate material melting and are performed fully automatically. When a thermal loading is not desired, the adhesive process for producing the pressure tight connection is suitable. Since the screw connection between the regulator and the closing plate is dispensed with, the components of the hydraulic unit, such as for example, screws and safety rings are dispensed with and therefore a compact construction is provided, weight is reduced, and manufacturing costs are lowered. The closing plate can be made of synthetic plastic material without expensive material-removing operation in a precise, cost-favorable manner and with a low mass.

It is also advantageous that the pretentioning loss and untightness as a result of, for example, aging which can occur in force-transmitting connections as well as due different thermal expansion coefficients of the materials connected with one another, are excluded in the inventive hydraulic unit.

For increasing the packing density of the regulator on the connecting plate, the housing of the regulator can have an oval cross-section instead of a round cross-section. Such a cross-section is further improved by the construction of the flux-conducting element of the regulator.

Because of the displacement of the supply and discharge passage from the valve closing element of the regulator to the supporting plate identified as a closing plate, the passage cross-section can be formed in an optimal manner with the same space consumption. Therefore, the pressure medium is deviated relatively little, and a relatively high hydraulic flow cross-section can be provided. In particular in cold condition, a high pressure throughflow is guaranteed.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
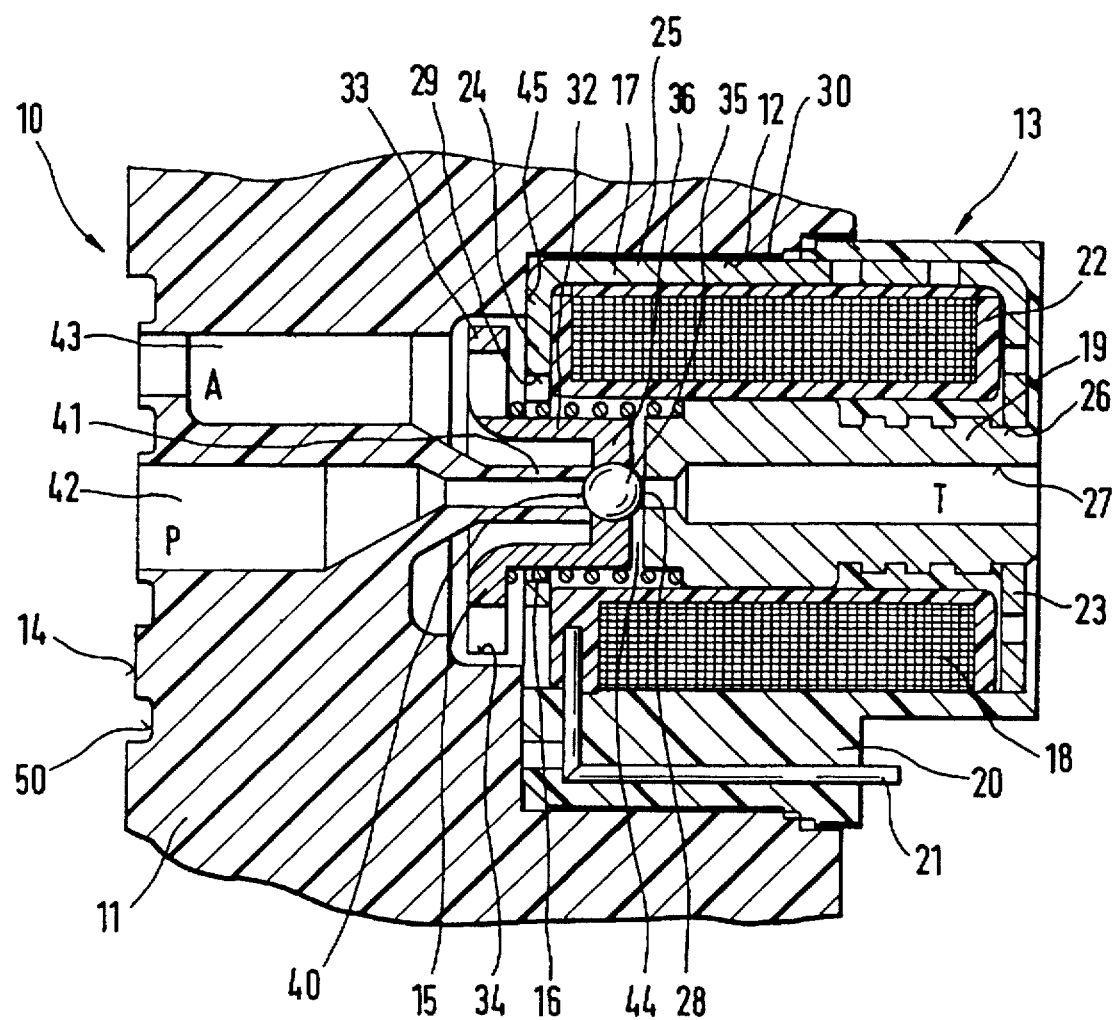
FIG. 1 is a view showing a longitudinal section of a hydraulic unit in accordance with the present invention.

FIG. 1 shows a hydraulic unit in accordance with the present invention which is identified as a whole with reference 10. It has a closing plate 11 which is composed of a thermoplastic material, for example PA 6.6 and has a recess 12. An electromagnetic regulator 13 is inserted in the recess 12. The electromagnetic regulator has a housing 20 which is also composed of a thermoplastic material and partially extends beyond the closing plate 11. The housing 20 and the closing plate 11 are non-releasably welded with one another in a pressure-tight manner. A laser welding or an ultrasound welding can be utilized for this purpose. During welding, because of the heat transfer the material of the housing 20 of the regulator 13 and the material of the closing plate 11 in a small region around the separating point of both components is melted and thereby connected. The length of the welded region 30 is variable.

The regulator 13 has a magnetic coil 18 wound on a coil body 22 and provided with electrical terminals 21. Cover plates 23 and 24 are located at both end sides of the coil body 22 and connected with one another through a straight web 25 extending on the periphery of the coil. The cover plates 23 and 24 and the web 25 form a flux conducting element 17 composed of a magnetically conductive material. Both cover plates 23 and 24 have central openings 26 and 29.

The electrical terminals 21 of the magnetic coil 18 extend first in a radial direction toward the magnetic coil 18 and are bent perpendicularly in a certain distance from the axis of the magnetic coil. The bent region of the electrical terminal 21 is located diametrically opposite to the web 25 of the flux conducting element 17 and extends parallel to the periphery of the coil outwardly. This arrangement, in connection with the manufacture of the housing 20 of the regulator 13 with a synthetic plastic injection molding process, contributes to the formation of an oval outer contour for the housing 20 of the regulator 13. A compact arrangement of several regulators 13 on one connecting plate 11 is thereby possible.

A coil core 19 is inserted in a cylindrical inner chamber of the coil body 22 which is open at its sides. The coil core 19 has a length which is approximately ⅔ the length of the magnetic coil 18. The end of the coil core 19 are pressed into the opening 26 of the cover plate 23 which is spaced from the recess and is flush with the outer wall of the housing 20 of the regulator 13. The end of the coil core 19 located inside the coil body 22 is arranged in the region of the maximum magnetic flux of the magnetic coil 18.

A longitudinal opening 27 is located centrally in the coil core 19 and has one step. It leads to a not shown tank for the pressure medium. A tank-side sealing seat 28 is formed on the end of the longitudinal opening which is located inside the coil body 22. This sealing seat 28 cooperates with a closing element 38 of a moveable armature 15.

The cup-shaped armature 15 extends with its cylindrical part 32 through the opening 29 of the inwardly located cover plate 24. It is closed by an armature bottom 36 at the end located inside the coil body 22. A closing element 35 formed as a ball is pressed in a central opening in the armature bottom 36. The armature 15 is provided with a flange 33 which is located outside of the magnetic coil 18 and has several passages 34. An armature spring 16 formed as a pressure spring has one end which abuts against the flange 33 and another end which abuts against the stationary coil core 19. When the magnetic coil 18 is not supplied with current, the armature spring 16 presses the armature 15 against supply-side sealing seat 40 which is also sealed by the closing element 35 of the armature 15. This supply-side sealing seat 40 is located with the tank-side sealing seat 28 on a joint longitudinal axis extending through the hydraulic unit 10 and is formed on a tubular extended supply projection 41 of the connecting plate 11.

The supply projection 41 extends into the interior of the magnetic coil 18 so that a working air gap 44 is formed between the armature bottom 36 of the armature 15 pressed against the supply-side seat 40 on the one hand and the coil core 19 on the other hand. The armature 15 is arranged moveably in the working air gap 44 under the action of a spring or a magnetic force.

Figure 2:
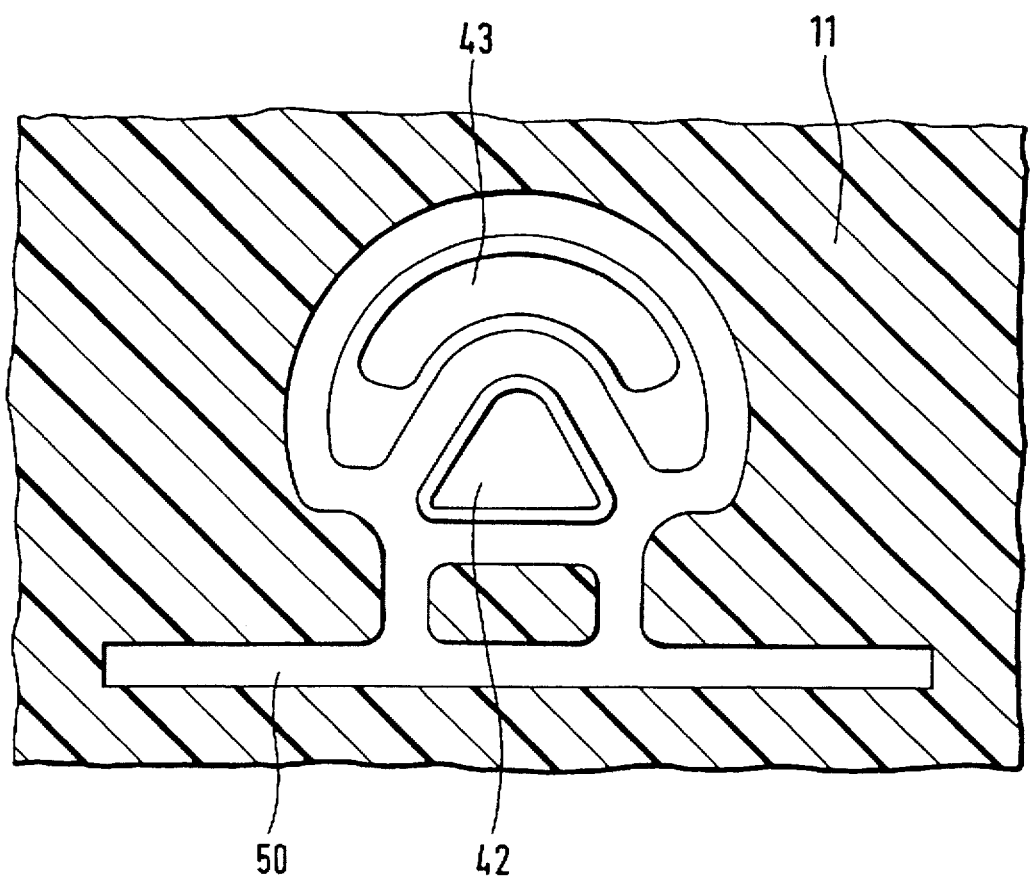
FIG. 2 is a side view of the inventive hydraulic unit, in a simplified showing.

A supply passage 42 which ends in the supply-side sealing seat 40 of the supply projection 41 is formed in the closing plate 11 and communicates with a not shown pressure medium pump. As shown in FIG. 2, the supply passage 42 is rotation-asymmetrical, in particular triangular, in order to increase the flow cross-section in the region of the flange surface 14 of the connecting plate 11 which is opposite to the regulator housing 20.

As can be seen from FIG. 1, in the further course of the supply passage 42 it has a transition region in which the supply passage 42 merges from the approximately triangular cross-section to a round cross-section. This round cross-section is eccentric to the triangular cross-section and ends in the supply-side sealing seat 40. A further passage which forms a working passage 43 is formed in the connecting plate 11 and leads to a not shown hydraulic consumer. The working passage 43, as shown in FIG. 2, has a kidney-shaped cross-section and partially surrounds the supply passage 42. The sealing between the supply passage 42 and the working passage 43 and also from outside is performed by a not shown shaped seal. This seal is inserted in a corresponding groove 50 on the flange surface 18 of the closing plate 11.

The operation of the hydraulic unit is performed as follows:

FIG. 1 shows a basic position of the hydraulic unit 10 when the magnetic coil 18 is not supplied with current. The armature spring 16 is supported against the stationary coil core 19 and presses the armature 15 with its closing element 35 against the supply-side sealing seat 40. The supply passage 42 is thefore tightly closed. In this position of the armature 15 the tank-side sealing seat 28 is open, so that the working passage 43 communicates through the passage 34 in the flange part 33 of the armature 15 and through the armature spring 16 with the longitudinal opening 27 which leads to the tank. Therefore the pressure medium located in the working passage 43 and in the hydraulic consumer can discharged to the tank.

In a second switching position of the hydraulic unit 10 the magnetic coil 18 is supplied with current. The magnetic field produced by the magnetic coil 18 moves the armature 15 against the spring force of the armature spring 16 toward the tank-side sealing seat 28. In the end position the closing element 35 of the armature seals the longitudinal opening 27 which leads to the tank. Because of the double function of the closing element 35 the sealing seat 40 is now opened. The supply passage 42 is in direct communication with working passage 43 so that the pressure medium supplied from the pressure medium pump can flow through the supply passage 42 and the working passage 43 to the not shown hydraulic consumer. The hydraulic unit can therefore operate as a 3/2 switching valve. When the current supply to the magnetic coil 18 is interupted, the aremature 15 is moved back to the basic position by the spring force of the armature spring 15.

It is of course to be understood that modifications and changes of the above described embodiment can be possible within the basic idea of the present invention. For example, in the invent of glueing of the housing 20 of the regulator 13 with the closing plate 11, especially good centering for the hosing 20 of the regulator 13 and an exact conicidence of the both sealing seats 28 and 40 with one another is obtained when the regulator 13 is inserted in the recess 12 with a slight pressure fit. If the recess 20 additionally has an abudment shoulder 45 which can cooperate with the end side of the housing 20 of the regulator 13, then the width of the air gap 44 for the armature 15 can be maintained very accurate in a simple manner and therefore the mounting is simplified.

Also, various possibilities are recommended for electrical contacting of the magnetic coil 18 of the regulator 13. The contacting can be performed purely mechanically by a plugged counter-plug or in a space-saving manner by solder connections with conductors printed on a flex foil. Specially prepared surfaces on the housing 20 of the regulator 13 can operate for the flex foil as position fixing means.

It will be understood that each of the elements described above, or two or more together, may also find a useful application in other types of constructions differing from the types described above.

While the invention has been illustrated and described as embodied in hydraulic unit, it is not intended to be limited to the details shown, since various modifications and structura changes may be made without departing in any way from the spirit of the present invention.

Without further analysis, the foregoing will so fully reveal the gist of the present invention that others can, by applying current knowledge readily, adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hydraulic unit, comprising a closing plate having at least one recess in which a supply passage and a discharge passage for pressure medium open; an electromagnetic regulator inserted in said recess and having a magnetic part composed of a housing, a magnetic coil with a coil core, a flux conducting element and an armature, said closing plate having a supply projection extending in said recess of said closing plate and receiving said supply passage, said supply projection having an end extending in said magnetic part of said regulator and ending in a sealing seat, said sealing seat cooperating with said armature of said magnetic part for controling said discharge passage.

2. A hydraulic unit as defined in claim 1; and further comprising means forming a working passage having a kidney-shaped cross-section, said closing plate having a flange surface, said supply passage in the region of said flange surface having a triangular cross-section and being at least partially surrounded said working passage.

3. A hydraulic unit as defined in claim 1, wherein said closing plate and said housing of said regulator are composed of a synthetic plastic material and non-releasably connected with one another in a pressure-tight manner.

4. A hydraulic unit as defined in claim 3; and further comprising means for connecting said closing plate and said housing of said regulator and including a welding connection.

5. A hydraulic unit as defined in claim 4, wherein said welding connection is formed as an ultrasound connection.

6. A hydraulic unit as defined in claim 4, wherein said welding connection is formed as a laser welding connection.

7. A hydraulic unit as defined in claim 4; and further comprising means for connecting said closing plate and said housing of said regulator and including an adhesive connection.

8. A hydraulic unit as defined claim 1, wherein said flux conducting element of said regulator has two plates provided with openings so as to cover a winding of said magnetic coil at an end side and to be connected with one another by a web extending over a periphery of said magnetic coil.

9. A hydraulic unit as defined in claim 1, wherein said housing of said regulator has at least partially an oval cross-section.

10. A hydraulic unit as defined in claim 1, wherein said armature is cup-shaped and has a flange provided with passages and located outside of said magnetic coil parallel to an end side of said magnetic coil, said armature also having a cylindrical part in which said flange merges; and further comprising an armature bottom which closes an end of said cylindrical part located opposite to said flange and inside said magnetic coil; and a closing element pressed in said armature bottom.

11. A hydraulic unit as defined in claim 10, wherein said supply passage and said coil core are provided with sealing seats, said closing elements of said armature being ball-shaped and cooperating with said sealing seats.

* * * * *